(12) United States Patent
Yu et al.

(10) Patent No.: US 10,217,281 B2
(45) Date of Patent: Feb. 26, 2019

(54) APPARATUS FOR RECONSTRUCTING 3D MODEL AND METHOD FOR USING THE SAME

(71) Applicant: ELECTRONICS AND TELECOMMUNICATIONS RESEARCH INSTITUTE, Daejeon (KR)

(72) Inventors: Jung-Jae Yu, Daejeon (KR); Kyung-Kyu Kang, Daejeon (KR); Hye-Sun Kim, Daejeon (KR); Chang-Joon Park, Daejeon (KR); Yun-Ji Ban, Daejeon (KR); Dong-Wan Ryoo, Daejeon (KR); Man-Hee Lee, Daejeon (KR); Chang-Woo Chu, Daejeon (KR)

(73) Assignee: ELECTRONICS AND TELECOMMUNIFACTIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/649,539

(22) Filed: Jul. 13, 2017

(65) Prior Publication Data
US 2018/0165875 A1    Jun. 14, 2018

(30) Foreign Application Priority Data
Dec. 13, 2016    (KR) ........................ 10-2016-0169340

(51) Int. Cl.
*G06T 5/00*         (2006.01)
*H04N 13/282*    (2018.01)
*G06T 17/20*       (2006.01)
*G06T 7/246*       (2017.01)
*H04N 13/296*    (2018.01)

(52) U.S. Cl.
CPC ................ *G06T 17/20* (2013.01); *G06T 5/00* (2013.01); *G06T 5/006* (2013.01); *G06T 7/246* (2017.01); *G06T 7/251* (2017.01); *H04N 13/282* (2018.05); *H04N 13/296* (2018.05); *G06T 2207/10028* (2013.01)

(58) Field of Classification Search
None
See application file for complete search history.

(56) References Cited

U.S. PATENT DOCUMENTS

2012/0162215 A1    6/2012    Cha et al.
2013/0107003 A1    5/2013    Lim et al.
(Continued)

FOREIGN PATENT DOCUMENTS

CN    105184863 A    * 12/2015    ............. G06T 17/20
KR    10-2012-0056668 A    6/2012
(Continued)

*Primary Examiner* — Said Broome

(57) ABSTRACT

Disclosed herein are an apparatus and method for reconstructing a 3D model. The apparatus for reconstructing a 3D model includes an image acquisition unit for acquiring multi-view images by receiving image signals captured by multiple drones using cameras, a geometric calibration unit for estimating motion variables of the drones based on the acquired multi-view images, and a 3D model creation unit for reconstructing a 3D model of a dynamic object from the matched multi-view images using a multi-view stereo method.

12 Claims, 9 Drawing Sheets

(56) References Cited

U.S. PATENT DOCUMENTS

2013/0176400 A1   7/2013  Jang et al.
2014/0316616 A1*  10/2014  Kugelmass ............ G05D 1/101
                                                        701/8

FOREIGN PATENT DOCUMENTS

| KR | 10-2013-0047194 A | 5/2013 |
| KR | 10-2016-0003614 A | 1/2016 |
| KR | 10-1608753 B1 | 4/2016 |

* cited by examiner

APPARATUS FOR RECONSTRUCTING 3D MODEL AND METHOD FOR USING THE SAME

CROSS REFERENCE TO RELATED APPLICATION

This application claims the benefit of Korean Patent Application No. 10-2016-0169340, filed Dec. 13, 2016, which is hereby incorporated by reference in its entirety into this application.

BACKGROUND OF THE INVENTION

1. Technical Field

The present invention relates generally to 3D modeling technology, and more particularly to technology for reconstructing a 3D model using a drone.

2. Description of the Related Art

Existing technologies for reconstructing a 3D model of an object or space based on images may be largely categorized into 3D reconstruction based on multi-view images, which are simultaneously captured in limited space, and 3D reconstruction based on the movement of a camera.

First, reconstruction based on multi-view images is configured such that images of a target object are simultaneously captured using multiple cameras fixed in limited space and 3D reconstruction is performed using the images. Here, the fixed cameras capture images of the target object that falls within overlapping fields of view of the cameras in the state in which geometric calibration of the cameras has been performed to determine the relative position and orientation thereof using a calibration tool, such as a checkboard or the like. Here, if the cameras can successively capture images by being synchronized on a time axis, the dynamically moving target object may be reconstructed in 3D by applying an existing multi-view stereo reconstruction method to the multi-view images captured at each time frame.

Second, in the case of 3D reconstruction based on the movement of a camera, a single camera successively captures images while moving around a static background or a static target object, and the 3D reconstruction of the static background (target object) is performed using a time difference resulting from the movement of the camera. This technique, which is called Structure from Motion (SfM), is configured such that, using the characteristic whereby the target object to be captured is static, images captured by a single moving camera are regarded as images simultaneously taken from different positions in space at the same point on a time axis, and the distance by which the single camera moves during the interval between the points at which an image is captured is regarded as a baseline between multiple cameras, whereby 3D reconstruction is performed. This technique is advantageous in that a wide area may be reconstructed in 3D using a single camera without limitation as to space, but has a limitation in that only a static region can be reconstructed from the captured images. Alternatively, images may be captured by multiple cameras while a multi-camera rig, in which the relative locations between the multiple cameras are fixed, moves. However, this method is disadvantageous in that reconstructed 3D information has low accuracy due to the short distance between the cameras fixed in the multi-camera rig.

The first-mentioned reconstruction method based on multi-view images enables a dynamically moving object to be reconstructed in 3D, but has a limitation in that only an object that is moving within overlapping fields of view of fixed cameras can be reconstructed in 3D.

The second 3D reconstruction method based on the movement of a camera enables the background space, captured by a camera that can move without spatial limitation, to be reconstructed in 3D, but has a limitation in that only a static object, but not a dynamically moving object, may be reconstructed in 3D.

Accordingly, it is difficult to apply the two methods in order to reconstruct the shape of an object having a deformable body, the shape of which changes while moving in the wide open-air space. For example, when the reconstruction of the shape of a moving object (a person or an animal) is attempted using multiple Unmanned Aerial Vehicle (UAV) cameras that follow the moving object outdoors, the two methods are not suitable. Also, when the two methods are simply combined, that is, when a movable multi-view camera rig is used, images must be captured while a multi-camera rig that is large enough to have a long baseline between the cameras fixed thereon moves in order to reconstruct a high-quality 3D shape from a dynamic object, but this is costly and has a limitation as to the operation of the cameras. Therefore, it is also not suitable for solving the above problem.

Meanwhile, Korean Patent Application Publication No. 10-2012-0056668, titled "Apparatus and method for reconstructing 3D information", discloses an apparatus and method for reconstructing the shape and movement of a person in 3D information through a hybrid method using three fixed Time-of-Flight (TOF) cameras.

However, Korean Patent Application Publication No. 10-2012-0056668 discloses an apparatus and method for reconstructing a 3D model only of a static object and has a limitation in that the 3D shape of a dynamic object that is moving in open-air space may not be reconstructed.

SUMMARY OF THE INVENTION

An object of the present invention is to reconstruct a 3D model of a dynamic object that is moving in open-air space using cameras that are capable of moving by being installed in multiple drones and of capturing images by being synchronized on a time axis.

Another object of the present invention is to estimate a geometric relationship between moving cameras, which changes on a time axis, and to provide accurate 3D information about a moving object through multi-view stereo 3D reconstruction at each point at which an image is captured.

A further object of the present invention is to use a geometric relationship between moving cameras and to thereby reconstruct a 3D model within overlapping fields of view without distinction between a static background and a dynamic object.

In order to accomplish the above object, an apparatus for reconstructing a 3D model according to an embodiment of the present invention includes an image acquisition unit for acquiring multi-view images by receiving image signals captured by multiple drones using cameras; a geometric calibration unit for estimating motion variables of the drones based on the acquired multi-view images; and a 3D model creation unit for reconstructing a 3D model of a dynamic object from the matched multi-view images using a multi-view stereo method.

The multiple drones may be configured to be synchronized on a same time axis in consideration of a preset baseline and to capture the dynamic object.

The geometric calibration unit may include an individual geometric calibration unit for generating 3D point clouds of a static background for each of the drones based on the multi-view images and estimating motion variables based on one or more spatial axes; a background-matching unit for generating 3D information of the static background and 3D transform information by matching the 3D point clouds of the static background, and for estimating motion variables based on any one spatial axis using the 3D information of the static background and the 3D transform information; and a bundle adjustment unit for optimizing the 3D information of the static background using a bundle adjustment method.

If a Euclidean distance between 3D points of the 3D point clouds is equal to or less than a preset value and if an average color intensity in a block image based on projective coordinates, acquired by projecting the 3D points onto a frame image on which features corresponding to the 3D points are detected, is equal to or less than another preset value, the background-matching unit may determine that the 3D points are a same 3D point.

The background-matching unit may generate the 3D transform information from any one of the 3D point clouds of the static background using an Iterative Closest Point (ICP) algorithm.

The bundle adjustment unit may optimize the 3D information by transforming the motion variables such that trajectories of the multiple drones are arranged on a same spatial axis using the 3D transform information.

The bundle adjustment unit may perform the bundle adjustment method using the transformed motion variables and the 3D information of the static background.

The 3D model creation unit may be configured to estimate a geometric relationship between the drones using the transformed motion variables and to reconstruct the 3D model of the dynamic object based on the geometric relationship.

The 3D model creation unit may generate a depth map for reconstructing the 3D model of the dynamic object based on a region that includes the moving dynamic object in the multi-view images using a multi-view stereo method in which the geometric relationship on a same time axis is used.

The 3D model creation unit may generate at least one of a 3D voxel model and a 3D mesh model of the dynamic object for each point on a time axis by blending the depth map.

Also, in order to accomplish the above object, a method for reconstructing a 3D model, in which an apparatus for reconstructing a 3D model is used, according to an embodiment of the present invention includes acquiring multi-view images by receiving image signals captured by multiple drones; estimating motion variables of the drones based on the acquired multi-view images; and reconstructing a 3D model of a dynamic object from the matched multi-view images using a multi-view stereo method.

Estimating the motion variables may include generating 3D point clouds of a static background for each of the drones based on the multi-view images and estimating motion variables based on one or more spatial axes; generating 3D information of the static background and 3D transform information by matching the 3D point clouds of the static background and estimating motion variables based on any one spatial axis using the 3D information of the static background and the 3D transform information; and optimizing the 3D information of the static background using a bundle adjustment method.

Estimating the motion variables based on any one spatial axis may be configured such that, if a Euclidean distance between 3D points of the 3D point clouds is equal to or less than a preset value and if an average color intensity in a block image based on projective coordinates, acquired by projecting the 3D points onto a frame image on which features corresponding to the 3D points are detected, is equal to or less than another preset value, it is determined that the 3D points are a same 3D point.

Estimating the motion variables based on any one spatial axis may be configured to generate the 3D transform information from any one of the 3D point clouds of the static background using an Iterative Closest Point (ICP) algorithm.

Optimizing the 3D information may be configured to optimize the 3D information by transforming the motion variables such that trajectories of the multiple drones are arranged on any one spatial axis using the 3D transform information.

Optimizing the 3D information may be configured to perform the bundle adjustment method using the transformed motion variables and the 3D information of the static background.

Reconstructing the 3D model may be configured to estimate a geometric relationship between the drones using the transformed motion variables and to reconstruct the 3D model of the dynamic object based on the geometric relationship.

Reconstructing the 3D model may be configured to generate a depth map for reconstructing the 3D model of the dynamic object based on a region that includes the moving dynamic object in the multi-view images using a multi-view stereo method in which the geometric relationship on a same time axis is used.

Reconstructing the 3D model may be configured to generate any one of a 3D voxel model and a 3D mesh model of the dynamic object for each point on a time axis by blending the depth map.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
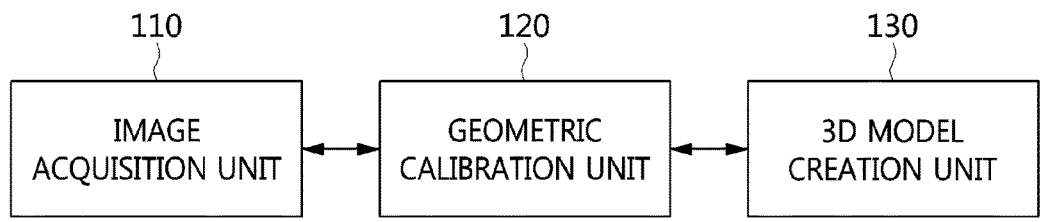
FIG. 1 is a block diagram that shows an apparatus for reconstructing a 3D model according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising", and "includes" and/or "including" specify the presence of stated elements but do not preclude the presence or addition of one or more other elements unless otherwise specified.

Hereinafter, a preferred embodiment according to the present invention will be described in detail with reference to the accompanying drawings.

FIG. 1 is a block diagram that shows an apparatus for reconstructing a 3D model according to an embodiment of the present invention.

Referring to FIG. 1, an apparatus for reconstructing a 3D model according to an embodiment of the present invention includes an image acquisition unit 110, a geometric calibration unit 120, and a 3D model creation unit 130.

The image acquisition unit 110 may acquire multi-view images by receiving image signals captured by multiple drones using cameras.

Here, the multiple drones may capture images of a moving object by being synchronized on the same time axis in consideration of a preset baseline.

Here, the multiple drones may maintain the preset baseline.

That is, the image acquisition unit 110 may successively capture images while multiple movable cameras, such as cameras installed in a drone, an Unmanned Aerial Vehicle (UAV), or the like, are moving to follow the dynamic object to be reconstructed in the state in which the cameras are synchronized on the time axis.

Here, if the dynamic object to be reconstructed in 3D moves within limited space, the respective cameras may successively capture images of the object by focusing on it while moving along a circular arc in the air. Therefore, the application of the method according to the present invention is not limited only to the case in which the target to be reconstructed is moving.

The geometric calibration unit 120 may estimate motion variables of the drones based on the acquired multi-view images.

The geometric calibration unit 120 may include an individual geometric calibration unit 121, a background-matching unit 122, and a bundle adjustment unit 123.

The individual geometric calibration unit 121 may generate 3D point clouds of a static background for the respective drones based on the multi-view images and may estimate motion variables based on one or more spatial axes.

Here, the individual geometric calibration unit 121 may generate motion variables of each of the moving cameras and 3D point clouds of a static background using a Structure from Motion (SFM) method.

Here, the individual geometric calibration unit 121 may estimate the motion variables of the respective moving cameras by applying Random Sample Consensus (RANSAC) to natural features matching information extracted from the multi-view images.

Also, the individual geometric calibration unit 121 may estimate motion variables for the multiple drones using at least one of GPS information and inertia sensor information included in position information.

Here, if the individual geometric calibration unit 121 uses GPS information, a scale factor of the 3D information of the static background, reconstructed based on the images acquired from the moving cameras, is assumed to be consistent.

Here, the individual geometric calibration unit 121 may estimate 3D points for inliers of the static background using the motion variables, and may generate 3D point clouds of the static background using the 3D points remaining after eliminating the 3D points for outliers detected in the dynamic object.

The background-matching unit 122 may generate 3D information of the static background and 3D transform information by matching the 3D point clouds of the static background with each other, and may estimate motion variables based on any one spatial axis using the 3D information of the static background and the 3D transform information.

Here, if the Euclidean distance between the 3D points of the 3D point clouds is equal to or less than a preset value and if an average color intensity in a block image based on projective coordinates, acquired by projecting the 3D points onto a frame image on which features corresponding to the 3D points are detected, is equal to or less than another preset value, the background-matching unit 122 determines that the 3D points are the same 3D point.

Here, the background-matching unit 122 may generate 3D transform information from any one of the 3D point clouds of the static background using an Iterative Closest Point (ICP) algorithm.

In the homogeneous coordinate system, which is a geometric representation method, 3D transform information, such as a 3D transform matrix $H_{21}$, may be represented as a 4×4 matrix.

The 3D transform matrix may correspond to isometric transformation, similarity transformation, affine transformation, projective transformation, or the like depending on the degrees of freedom of elements in the matrix.

In an embodiment of the present invention, isometric transformation including rotation and movement may be used for convenience, and even if spatial distortion beyond the isometric transformation occurs, because $H_{21}$, acquired as a result of the application of an ICP algorithm, may be used in the same way, the use thereof is not limited.

For example, assuming that the 3D transform matrix $H_{21}$ is isometric transformation, $H_{21}$ may be represented using a rotation matrix $R_{21}$ and a motion vector $T_{21}$, as Equation (1):

$$H_{21} = \begin{pmatrix} R_{21} & T_{21} \\ 0^T & 1 \end{pmatrix} \quad (1)$$

That is, the background-matching unit 122 may generate a transformed 3D point cloud matrix $X_1'$ by applying the 3D transform matrix $H_{21}$ to the matrix $X_1$, which is a matrix for the 3D point cloud generated based on the image input from each of the cameras installed in the drones, using Equation (2):

$$X_1' = H_{21} * X_1 \quad (2)$$

Here, the background-matching unit 122 may generate 3D information of the static background by matching the 3D point cloud, transformed based on the 3D transform information, with another 3D point cloud.

That is, the background-matching unit 122 may estimate the difference between spatial axes, and may optimally match the 3D point clouds of the static background, reconstructed from the respective images captured by the cameras.

The bundle adjustment unit 123 may optimize the 3D information of the static background using a bundle adjustment method.

Here, through the bundle adjustment method, optimization may be performed so that a cost function having various variables becomes a minimum value.

First, the bundle adjustment unit 123 may perform calibration such that the trajectories of the moving cameras are arranged on the same spatial axis depending on the 3D transform matrix $H_{21}$.

Here, the bundle adjustment unit 123 may perform optimization by transforming the motion variables using the 3D transform information so that the trajectories of the multiple drones are arranged on the same spatial axis.

For example, in the projective matrix ($P_1$, $P_2$) of the moving cameras, the internal variable K may be assumed to be a fixed value on the time axis, and when only the rotation matrix R and the motion vector T, which are motion variables, are assumed to change over time, the projective matrix of the two moving cameras may be represented as Equation (3):

$$P_1(t) = K_1 * [R_1(t) | T_1(t)]$$

$$P_2(t) = K_2 * [R_2(t) | T_2(t)] \quad (3)$$

Here, when considering that there is an inverse-transformation relationship between the transformation of the 3D point and the transformation of the axes of the moving camera in Equation (3), the projective matrix, the rotation matrix, and the motion vector of the moving camera may be modified using the 3D transform matrix $H_{21}$, as shown in Equation (4):

$$P_1'(t) = P_1(t) * H_{21}^{-1}$$

$$R_1'(t) = R_1(t) * R_{21}^{-1}$$

$$T_1'(t) = T_1(t) - R_1(t) * R_{21}^{-1} * T_{21} \quad (4)$$

Here, when the bundle adjustment unit 123 has completed these modifications, the motion variables of the moving camera 1 become meaningful in the spatial axis of the moving camera 2.

Then, the bundle adjustment unit 123 may perform integrated bundle adjustment by receiving the 3D information and 3D points of the static background, in which 3D point clouds are finally integrated, and the transformed motion variables (for example, the transformed motion variable of the moving camera 1 and the transformed motion variable of the moving camera 2) as input variables.

That is, the bundle adjustment unit 123 may perform bundle adjustment using the transformed motion variables and the 3D information of the static background.

The 3D model creation unit 130 may reconstruct a 3D model of the dynamic object from the matched multi-view images using a multi-view stereo method.

That is, using the multi-view stereo method, the 3D model creation unit 130 may reconstruct the 3D model of the dynamic object within overlapping fields of view at each point at which an image is captured.

Here, the 3D model creation unit 130 may perform the multi-view stereo method using geometric information of the movable camera installed in each of the drones.

Here, the 3D model creation unit 130 may use a 3D patch prediction-based point cloud creation method as the multi-view stereo method.

Also, the 3D model creation unit 130 estimates a geometric relationship between the drones using the transformed motion variables, and may reconstruct a 3D model of the dynamic object based on the geometric relationship.

Here, using the multi-view stereo method in which the geometric relationship on the same time axis is used, the 3D model creation unit 130 may generate a depth map for reconstructing the 3D model of the dynamic object based on the region that includes the moving object in the multi-view images.

Here, the 3D model creation unit 130 may create a 3D voxel model or a 3D mesh model of the dynamic object at each point on the time axis by blending the depth map.

Figure 2:
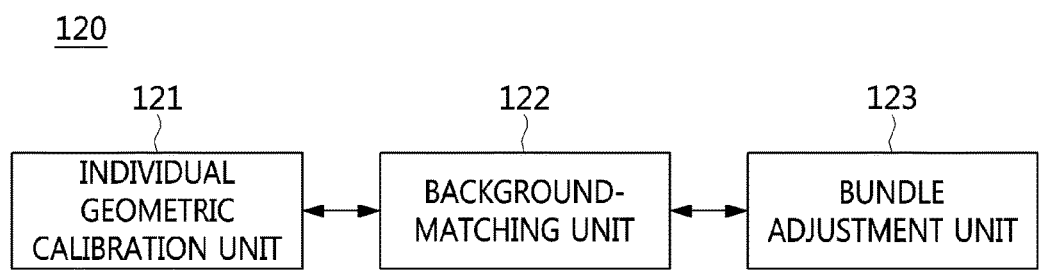
FIG. 2 is a block diagram that specifically shows an example of the geometric calibration unit illustrated in FIG. 1.

FIG. 2 is a block diagram that specifically shows an example of the geometric calibration unit illustrated in FIG. 1.

Referring to FIG. 2, the geometric calibration unit 120 may include an individual geometric calibration unit 121, a background-matching unit 122, and a bundle adjustment unit 123.

The individual geometric calibration unit 121 may generate 3D point clouds of a static background for the respective drones based on the multi-view images and may estimate motion variables based on one or more spatial axes.

Here, the individual geometric calibration unit 121 may generate motion variables of each of the moving cameras and 3D point clouds of a static background using a Structure from Motion (SFM) method.

Here, the individual geometric calibration unit 121 may estimate the motion variables of the respective moving cameras by applying Random Sample Consensus (RANSAC) to natural features matching information extracted from the multi-view images.

Also, the individual geometric calibration unit 121 may estimate motion variables for the multiple drones using at least one of GPS information and inertia sensor information included in position information.

Here, if the individual geometric calibration unit 121 uses GPS information, a scale factor of the 3D information of the static background, reconstructed based on the images acquired from the moving cameras, is assumed to be consistent.

Here, the individual geometric calibration unit 121 may estimate 3D points for inliers of the static background using the motion variables, and may generate 3D point clouds of the static background using the 3D points remaining after eliminating the 3D points for outliers detected in the dynamic object.

The background-matching unit 122 may generate 3D information of the static background and 3D transform information by matching the 3D point clouds of the static background with each other, and may estimate motion variables based on any one spatial axis using the 3D information of the static background and the 3D transform information.

Here, if the Euclidean distance between the 3D points of the 3D point clouds is equal to or less than a preset value, and if an average color intensity in a block image based on projective coordinates, acquired by projecting the 3D points onto a frame image on which features corresponding to the 3D points are detected, is equal to or less than another preset value, the background-matching unit 122 determines that the 3D points are the same 3D point.

Here, the background-matching unit 122 may generate 3D transform information from any one of the 3D point clouds of the static background using an Iterative Closest Point (ICP) algorithm.

In the homogeneous coordinate system, which is a geometric representation method, 3D transform information, such as a 3D transform matrix $H_{21}$, may be represented as a 4×4 matrix.

The 3D transform matrix may correspond to isometric transformation, similarity transformation, affine transformation, projective transformation, or the like depending on the degrees of freedom of elements in the matrix.

In an embodiment of the present invention, isometric transformation including rotation and movement may be used for convenience, and even if spatial distortion beyond the isometric transformation occurs, because $H_{21}$, acquired as a result of the application of an ICP algorithm, may be used in the same way, the use thereof is not limited.

For example, assuming that the 3D transform matrix $H_{21}$ is isometric transformation, $H_{21}$ may be represented using a rotation matrix $R_{21}$ and a motion vector $T_{21}$, as shown in the above Equation (1).

That is, the background-matching unit 122 may generate a transformed 3D point cloud matrix $X_1'$ by applying the 3D transform matrix $H_{21}$ to the matrix $X_1$, which is a matrix for the 3D point cloud generated based on the image input from each of the cameras installed in the drones, as Equation (2).

Here, the background-matching unit 122 may generate 3D information of the static background by matching the 3D point cloud, transformed based on the 3D transform information, with another 3D point cloud.

That is, the background-matching unit 122 may estimate the difference between spatial axes, and may optimally match the 3D point clouds of the static background, reconstructed from the respective images captured by the cameras.

The bundle adjustment unit 123 may optimize the 3D information of the static background using a bundle adjustment method.

Here, through the bundle adjustment method, optimization may be performed so that a cost function having various variables becomes a minimum value.

First, the bundle adjustment unit 123 may perform calibration such that the trajectories of the moving cameras are arranged on the same spatial axis depending on the 3D transform matrix $H_{21}$.

Here, the bundle adjustment unit 123 may perform optimization by transforming the motion variables using the 3D transform information so that the trajectories of the multiple drones are arranged on the same spatial axis.

For example, in the projective matrix $(P_1, P_2)$ of the moving cameras, the internal variable K may be assumed to be a fixed value on the time axis, and when only the rotation matrix R and the motion vector T, which are motion variables, are assumed to change as a function of time, the projective matrix of the two moving cameras may be represented as Equation (3).

Here, when considering that there is an inverse-transformation relationship between the transformation of the 3D point and the transformation of the axes of the moving camera in Equation (3), the projective matrix, the rotation matrix, and the motion vector of the moving camera may be modified using the 3D transform matrix $H_{21}$, as shown in Equation (4).

Here, when the bundle adjustment unit 123 has completed these modifications, the motion variables of the moving camera 1 become meaningful in the spatial axis of the moving camera 2.

Then, the bundle adjustment unit 123 may perform integrated bundle adjustment by receiving the 3D information and 3D points of the static background, in which 3D point clouds are finally integrated, and the transformed motion variables (for example, the transformed motion variable of the moving camera 1 and the transformed motion variable of the moving camera 2) as input variables.

That is, the bundle adjustment unit 123 may perform the bundle adjustment using the transformed motion variables and the 3D information of the static background.

Figure 3:
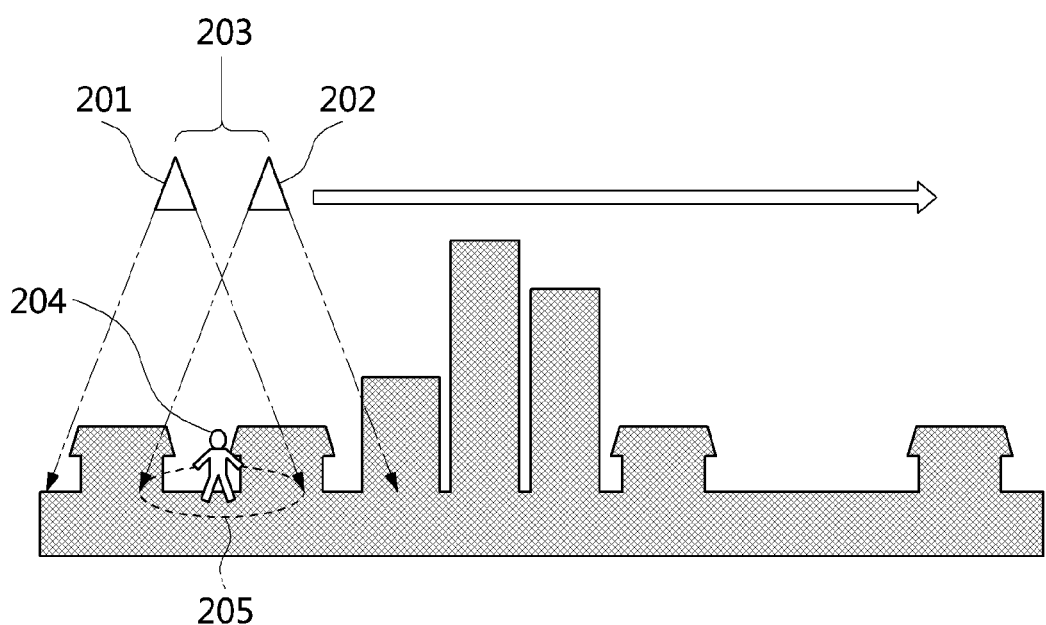
FIG. 3 is a view that shows the process of acquiring an image of a dynamic object according to an embodiment of the present invention.

FIG. 3 is a view that shows the process of acquiring an image of a dynamic object according to an embodiment of the present invention.

Referring to FIG. 3, it can be seen that a moving camera 1 201 and a moving camera 2 202 capture images of a dynamic object 204 to be reconstructed in 3D while following it in the air downtown.

Here, the moving cameras 201 and 202 may capture images while maintaining the state in which the dynamic object 204 to be reconstructed falls within a moving overlapping region 205, in which the field of view of one camera overlaps that of another camera.

Also, the positional relationship 203 between the two cameras may remain consistent. However, due the limitation of the mechanical operation or wind force, the positional relationship 203 between the moving cameras 201 and 202 may be slightly changed with the movement thereof.

Figure 4:
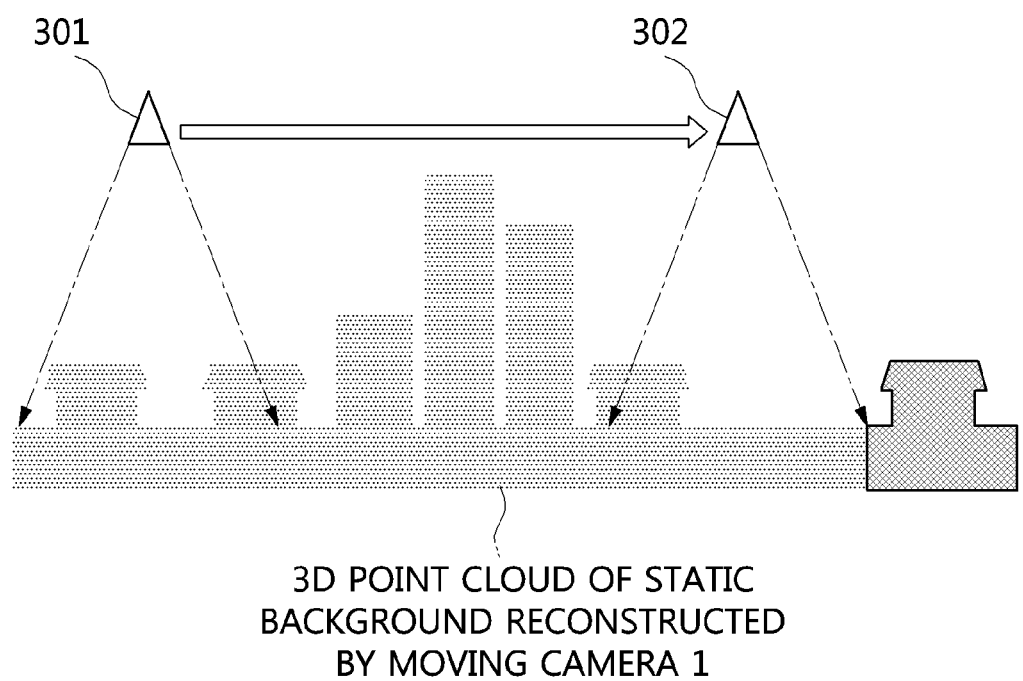
FIG. 4 is a view that shows the process of acquiring an image by the moving camera 1 illustrated in FIG. 3.

FIG. 4 is a view that shows the process of acquiring an image by the moving camera 1 illustrated in FIG. 3.

Referring to FIG. 4, it is confirmed that the moving camera 1 captures images while moving from the start point position 301 to the end point position 302.

Here, the apparatus for reconstructing a 3D model acquires a captured image from the moving camera 1 and generates a 3D point cloud using 3D points for the features of the static background using an SFM method. The gray region at the right end of FIG. 4 is not reconstructed because it is captured by the moving camera 2 but is not captured by the moving camera 1.

Figure 5:
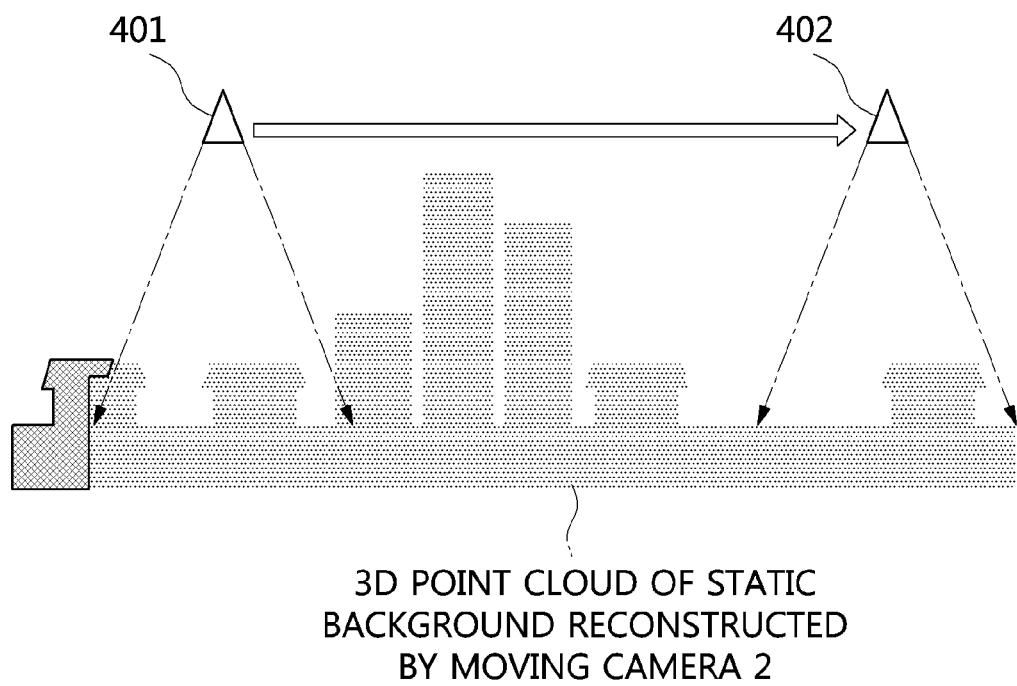
FIG. 5 is a view that shows the process of acquiring an image by the moving camera 2 illustrated in FIG. 3.

FIG. 5 is a view that shows the process of acquiring an image by the moving camera 2 illustrated in FIG. 3.

Referring to FIG. 5, it is confirmed that the moving camera 2 captures images while moving from the start point position 401 to the end point position 402.

Here, the apparatus for reconstructing a 3D model acquires a captured image from the moving camera 2 and generates a 3D point cloud using 3D points for the features of the static background using an SFM method. The gray region at the left end of FIG. 5 is not reconstructed because it is captured by the moving camera 1 but is not captured by the moving camera 2.

That is, as illustrated in FIG. 3 and FIG. 4, the apparatus for reconstructing a 3D model applies an SFM method separately to the images captured by the moving camera 1 and the images captured by the moving camera 2, and may perform bundle adjustment by including motion variables of the cameras and the 3D points of the point clouds of the background area illustrated in FIG. 3 and FIG. 4 (which are marked with dot patterns in FIGS. 3 and 4). The bundle adjustment may be performed so as to minimize 2D reprojection error when the 3D points of the 3D point cloud, reconstructed from the static background, are projected onto an image plane depending on the estimated camera projective matrix. In this process, because the input variables of the moving camera 1 differ from those of the moving camera 2 and because the estimated 3D point cloud sets of the static background differ from each other, the two data sets of 3D information acquired as a result of the bundle adjustment may include a slight spatial axis transform relationship therebetween. Because the motion variables of the moving camera 1 and those of the moving camera 2, acquired by the apparatus for reconstructing a 3D model, do not exist on the same spatial axis, calibration may be required.

Figure 6:
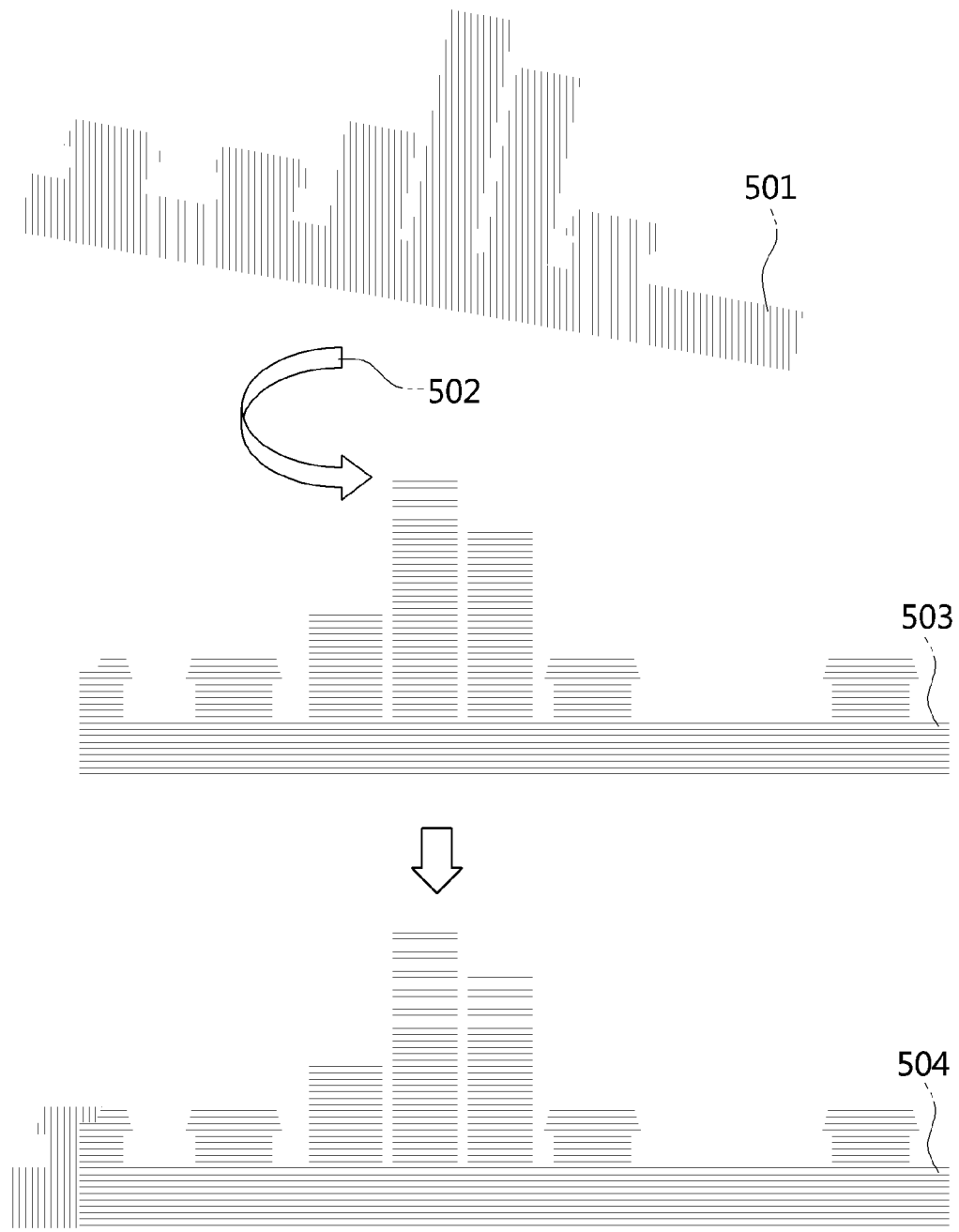
FIG. 6 is view that shows the process of matching images of 3D point clouds of a static background according to an embodiment of the present invention.

FIG. 6 is a view that shows the process of matching images of 3D point clouds of a static background according to an embodiment of the present invention.

Referring to FIG. 6, the apparatus for reconstructing a 3D model may estimate 3D transform information $H_{21}$ 502 through which the 3D point cloud 501 of the static background, acquired by applying an SFM method to the image captured by the moving camera 1, is transformed so as to optimally overlap the 3D point cloud 503 of the static background, acquired by applying the SFM method to the image captured by the moving camera 2.

Here, the apparatus for reconstructing a 3D model may match a 3D point cloud, which is calibrated by applying the 3D transform information $H_{21}$ 502 to the 3D point cloud 501 of the static background acquired from the moving camera 1, with the 3D point cloud 503 of the static background acquired from the moving camera 2.

Here, the apparatus for reconstructing a 3D model may generate 3D information 504 of the static background by matching the 3D point clouds 501 and 503 of the static background with each other.

That is, it is confirmed that the final 3D information 504 of the static background is generated so as to include the right end region in FIG. 4, which cannot be captured by the moving camera 1, and the left end region in FIG. 5, which cannot be captured by the moving camera 2.

Figure 7:
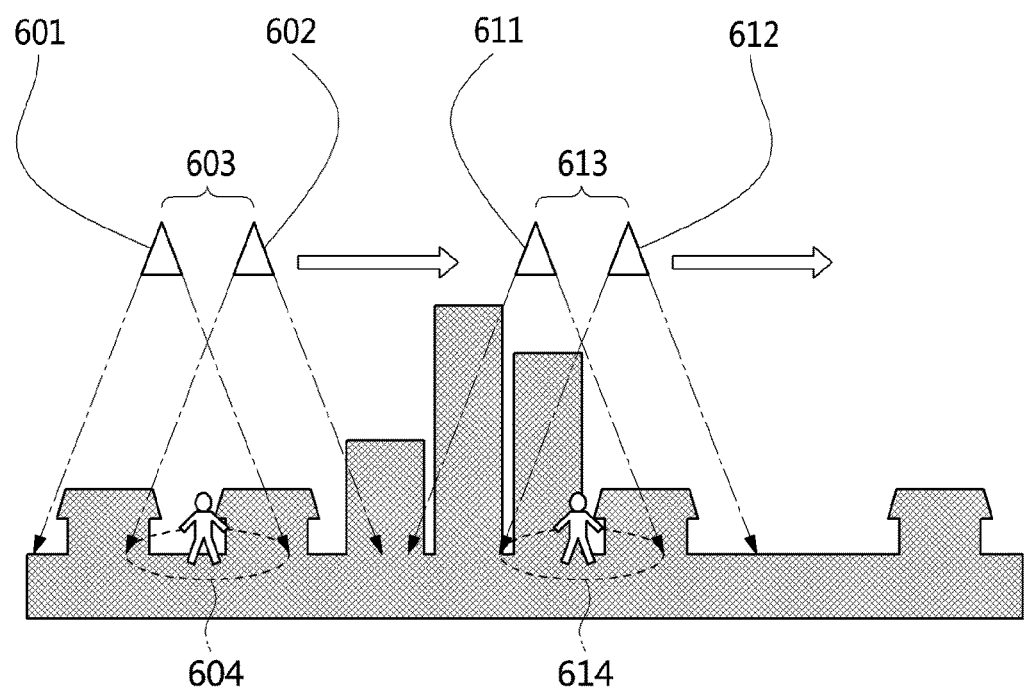
FIG. 7 is a view that shows the process of acquiring an image of a dynamic object in consideration of overlapping fields of view and a positional relationship between moving cameras according to an embodiment of the present invention.

FIG. 7 is a view that shows the process of acquiring an image of a dynamic object in consideration of the overlapping fields of view of moving cameras and the positional relationship therebetween according to an embodiment of the present invention.

Referring to FIG. 7, the apparatus for reconstructing a 3D model may acquire multi-view images for a dynamic object, which are captured by the moving cameras 601 and 602 at the start point in consideration the positional relationship 603 therebetween and a movable overlapping region 604 for the dynamic object at the start point.

Here, the apparatus for reconstructing a 3D model may control the moving cameras 611 and 612 so as to capture the dynamic object until the timepoint t while calibrating the positional relationship 613 and the movable overlapping region 614 using the 3D transform information generated from the 3D point clouds.

Figure 8:
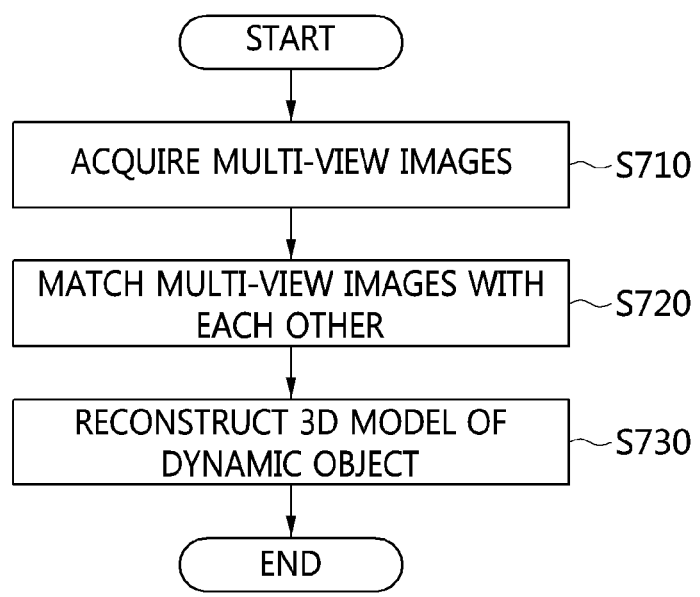
FIG. 8 is a flowchart that shows a method for reconstructing a 3D model according to an embodiment of the present invention.

FIG. 8 is a flowchart that shows a method for reconstructing a 3D model according to an embodiment of the present invention.

Referring to FIG. 8, in the method for reconstructing a 3D model according to an embodiment of the present invention, first, multi-view images may be acquired at step S710.

That is, multi-view images may be acquired at step S710 by receiving image signals captured by multiple drones using cameras.

Here, the multiple drones may capture a moving dynamic object by being synchronized on the same time axis in consideration of a preset baseline.

Here, the multiple drones may maintain the preset baseline.

That is, at step S710, images may be successively captured while multiple movable cameras, such as cameras installed in a drone, an Unmanned Aerial Vehicle (UAV), or the like, follow the dynamic object to be reconstructed in the state in which the cameras are synchronized on the time axis.

Here, if the dynamic object to be reconstructed in 3D moves within limited space, the respective cameras may successively capture images of the object by focusing on it while moving along a circular arc in the air. Therefore, the application of the method according to the present invention is not limited only to the case in which the target to be reconstructed is moving.

Also, in the method for reconstructing a 3D model according to an embodiment of the present invention, multi-view images may be matched at step S720.

That is, motion variables of the drones may be estimated based on the acquired multi-view images at step S720.

At step S720, first, a 3D point cloud may be generated at step S721.

That is, at step S721, 3D point clouds of a static background may be generated for the respective drones based on the multi-view images, and motion variables based on one or more spatial axes may be estimated.

Here, at step S721, motion variables of the respective moving cameras and 3D point clouds of the static background may be generated using a Structure from Motion (SFM) method.

Here, at step S721, the motion variables of the respective moving cameras may be estimated by applying Random Sample Consensus (RANSAC) to natural features matching information extracted from the multi-view images.

Also, at step S721, the motion variables for the multiple drones may be estimated using at least one of GPS information and inertia sensor information included in position information.

Here, at step S721, if GPS information is used, a scale factor of the 3D information of the static background, reconstructed based on the images acquired from moving cameras, may be assumed to be consistent.

Here, at step S721, 3D points for inliers of the static background may be estimated using the motion variables, and 3D point clouds of the static background may be generated using the 3D points remaining after eliminating the 3D points for outliers detected in the dynamic object.

Also, at step S720, 3D information of the static background may be generated at step S722.

That is, at step S722, 3D information of the static background and 3D transform information are generated by matching the 3D point clouds of the static background with each other, and motion variables based on any one spatial axis may be estimated using the 3D information of the static background and the 3D transform information.

Here, if the Euclidean distance between the 3D points of the 3D point clouds is equal to or less than a preset value and if an average color intensity in a block image based on projective coordinates, acquired by projecting the 3D points onto a frame image on which features corresponding to the 3D points are detected, is equal to or less than another preset value, it may be determined at step S722 that the 3D points are the same 3D point.

Here, at step S722, the 3D transform information may be generated from any one of the 3D point clouds of the static background using an Iterative Closest Point (ICP) algorithm.

In the homogeneous coordinate system, which is a geometric representation method, 3D transform information, such as a 3D transform matrix $H_{21}$, may be represented as a 4×4 matrix.

The 3D transform matrix may correspond to isometric transformation, similarity transformation, affine transformation, projective transformation, or the like depending on the degrees of freedom of elements in the matrix.

In an embodiment of the present invention, isometric transformation, including rotation and movement, may be used for convenience, and even if spatial distortion beyond the isometric transformation occurs, because $H_{21}$, acquired as a result of the application of an ICP algorithm, may be used in the same way, the use thereof is not limited.

For example, assuming that the 3D transform matrix $H_{21}$ is isometric transformation, $H_{21}$ may be represented using a rotation matrix $R_{21}$ and a motion vector $T_{21}$, as the above Equation (1).

That is, at step S722, a transformed 3D point cloud matrix $X_1'$ may be generated by applying the matrix $H_{21}$, corresponding to the 3D transform information, to the matrix $X_1$ for the 3D point cloud generated based on the image input from each of the cameras installed in the drones, as Equation (2).

Here, at step S722, the 3D information of the static background may be generated by matching the 3D point cloud, transformed based on the 3D transform information, with another 3D point cloud.

That is, at step S722, the difference between spatial axes is estimated, and the 3D point clouds of the static background, reconstructed from the respective images captured by cameras, may be optimally matched.

Also, at step S720, bundle adjustment may be performed at step S723.

That is, at step S723, the 3D information of the static background may be optimized using a bundle adjustment method.

Here, through the bundle adjustment method, optimization may be performed so that a cost function having various variables becomes a minimum value.

First, at step S723, calibration may be performed such that the trajectories of the moving cameras are arranged on the same spatial axis depending on the 3D transform matrix $H_{21}$.

Here, at step S723, optimization may be performed by transforming the motion variables using the 3D transform information so that the trajectories of the multiple drones are arranged on the same spatial axis.

For example, in the projective matrix ($P_1$, $P_2$) of the moving cameras, the internal variable K may be assumed to be a fixed value on the time axis, and when only the rotation matrix R and the motion vector T, which are motion variables, are assumed to change as a function of time, the projective matrix of the two moving cameras may be represented as Equation (3).

Here, when considering the existence of an inverse-transformation relationship between the transformation of the 3D point and the transformation of the axes of the moving camera in Equation (3), the projective matrix, the rotation matrix, and the motion vector of the moving camera may be modified using the 3D transform matrix $H_{21}$, as shown in Equation (4).

Here, at step S723, when these modifications have been completed, the motion variables of the moving camera 1 become meaningful in the spatial axis of the moving camera 2.

Also, at step S723, integrated bundle adjustment may be performed by receiving the 3D information and 3D points of the static background, in which 3D point clouds are finally integrated, and the transformed motion variables (for example, the transformed motion variable of the moving camera 1 and the transformed motion variable of the moving camera 2) as input variables.

That is, at step S723, the bundle adjustment may be performed using the transformed motion variables and the 3D information of the static background.

Also, in the method for reconstructing a 3D model according to an embodiment of the present invention, a 3D model of the dynamic object may be reconstructed at step S730.

That is, at step S730, the 3D model of the dynamic object may be reconstructed from the matched multi-view images using a multi-view stereo method.

Here, at step S730, using the multi-view stereo method, it is possible to reconstruct the 3D model of the dynamic object within overlapping fields of view at each point at which an image is captured.

Here, at step S730, the multi-view stereo method may be performed using geometric information of the movable camera installed in each of the drones.

Here, at step S730, a 3D patch prediction-based point cloud creation method may be used as the multi-view stereo method.

Also, at step S730, a geometric relationship between the drones may be estimated using the transformed motion variables, and the 3D model of the dynamic object may be reconstructed based on the geometric relationship.

Here, at step S730, using the multi-view stereo method in which a geometric relationship on the same time axis is used, it is possible to generate a depth map for reconstructing the 3D model of the moving object in the multi-view images.

Here, at step S730, a 3D voxel model or a 3D mesh model of the dynamic object may be generated at each point on the time axis by blending the depth map.

Figure 9:
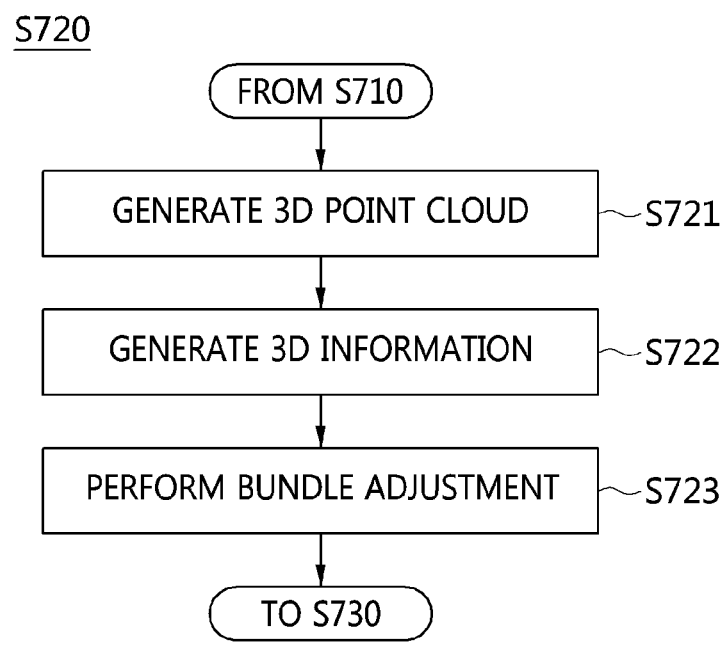
FIG. 9 is a flowchart that specifically shows an example of the step of matching multi-view images, illustrated in FIG. 8.

FIG. 9 is a flowchart that specifically shows an example of the step of matching multi-view images, illustrated in FIG. 8.

Referring to FIG. 9, first, a 3D point cloud may be generated at step S721.

That is, at step S721, 3D point clouds of a static background may be generated for respective drones based on the multi-view images, and motion variables based on one or more spatial axes may be estimated.

Here, at step S721, motion variables of the respective moving cameras and 3D point clouds of the static background may be generated using a Structure from Motion (SFM) method.

Here, at step S721, the motion variables of the respective moving cameras may be estimated by applying Random Sample Consensus (RANSAC) to natural features matching information extracted from the multi-view images.

Also, at step S721, the motion variables for the multiple drones may be estimated using at least one of GPS information and inertia sensor information included in position information.

Here, at step S721, if GPS information is used, a scale factor of the 3D information of the static background, reconstructed based on the images acquired from moving cameras, may be assumed to be consistent.

Here, at step S721, 3D points for inliers of the static background may be estimated using the motion variables, and 3D point clouds of the static background may be generated using the 3D points remaining after eliminating the 3D points for outliers detected in the dynamic object.

Also, at step S720, 3D information of the static background may be generated at step S722.

That is, at step S722, 3D information of the static background and 3D transform information are generated by matching the 3D point clouds of the static background with each other, and motion variables based on any one spatial axis may be estimated using the 3D information of the static background and the 3D transform information.

Here, if the Euclidean distance between the 3D points of the 3D point clouds is equal to or less than a preset value, and if an average color intensity in a block image based on projective coordinates, acquired by projecting the 3D points onto a frame image on which features corresponding to the 3D points are detected, is equal to or less than another preset value, it may be determined at step S722 that the 3D points are the same 3D point.

Here, at step S722, the 3D transform information may be generated from any one of the 3D point clouds of the static background using an Iterative Closest Point (ICP) algorithm.

In the homogeneous coordinate system, which is a geometric representation method, 3D transform information, such as a 3D transform matrix $H_{21}$, may be represented as a 4×4 matrix.

The 3D transform matrix may correspond to isometric transformation, similarity transformation, affine transformation, projective transformation, or the like depending on the degrees of freedom of elements in the matrix.

In an embodiment of the present invention, isometric transformation, including rotation and movement, may be used for convenience, and even if spatial distortion not conforming to isometric transformation occurs, because $H_{21}$, acquired as a result of the application of an ICP algorithm, may be used in the same way, the use thereof is not limited.

For example, assuming that the 3D transform matrix $H_{21}$ is isometric transformation, $H_{21}$ may be represented using a rotation matrix $R_{21}$ and a motion vector $T_{21}$ as the above Equation (1).

That is, at step S722, a transformed 3D point cloud matrix $X_1'$ may be generated by applying the matrix $H_{21}$, corresponding to the 3D transform information, to the matrix $X_1$ for the 3D point cloud generated based on the image input from each of the cameras installed in the drones, as Equation (2).

Here, at step S722, the 3D information of the static background may be generated by matching the 3D point cloud, transformed based on the 3D transform information, with another 3D point cloud.

That is, at step S722, the difference between spatial axes is estimated, and the 3D point clouds of the static background, reconstructed from the respective images captured by cameras, may be optimally matched.

Also, at step S720, bundle adjustment may be performed at step S723.

That is, at step S723, the 3D information of the static background may be optimized using a bundle adjustment method.

Here, through the bundle adjustment method, optimization may be performed so that a cost function having various variables becomes a minimum value.

First, at step S723, calibration may be performed such that the trajectories of the moving cameras are arranged on the same spatial axis depending on the 3D transform matrix $H_{21}$.

Here, at step S723, optimization may be performed by transforming the motion variables using the 3D transform information so that the trajectories of the multiple drones are arranged on the same spatial axis.

For example, in the projective matrix ($P_1$, $P_2$) of the moving cameras, the internal variable K may be assumed to be a fixed value on the time axis, and when only the rotation matrix R and the motion vector T, which are motion variables, are assumed to change as a function of time, the projective matrix of the two moving cameras may be represented as Equation (3).

Here, when considering the existence of an inverse-transformation relationship between the transformation of the 3D point and the transformation of the axes of the moving camera in Equation (3), the projective matrix, the rotation matrix, and the motion vector of the moving camera may be modified using the 3D transform matrix $H_{21}$, as shown in Equation (4).

Here, at step S723, when these modifications have been completed, the motion variables of the moving camera 1 become meaningful in the spatial axis of the moving camera 2.

Also, at step S723, integrated bundle adjustment may be performed by receiving the 3D information and 3D points of the static background, in which 3D point clouds are finally integrated, and the transformed motion variables (for example, the transformed motion variable of the moving camera 1 and the transformed motion variable of the moving camera 2) as input variables.

That is, at step S723, the bundle adjustment may be performed using the transformed motion variables and the 3D information of the static background.

Figure 10:
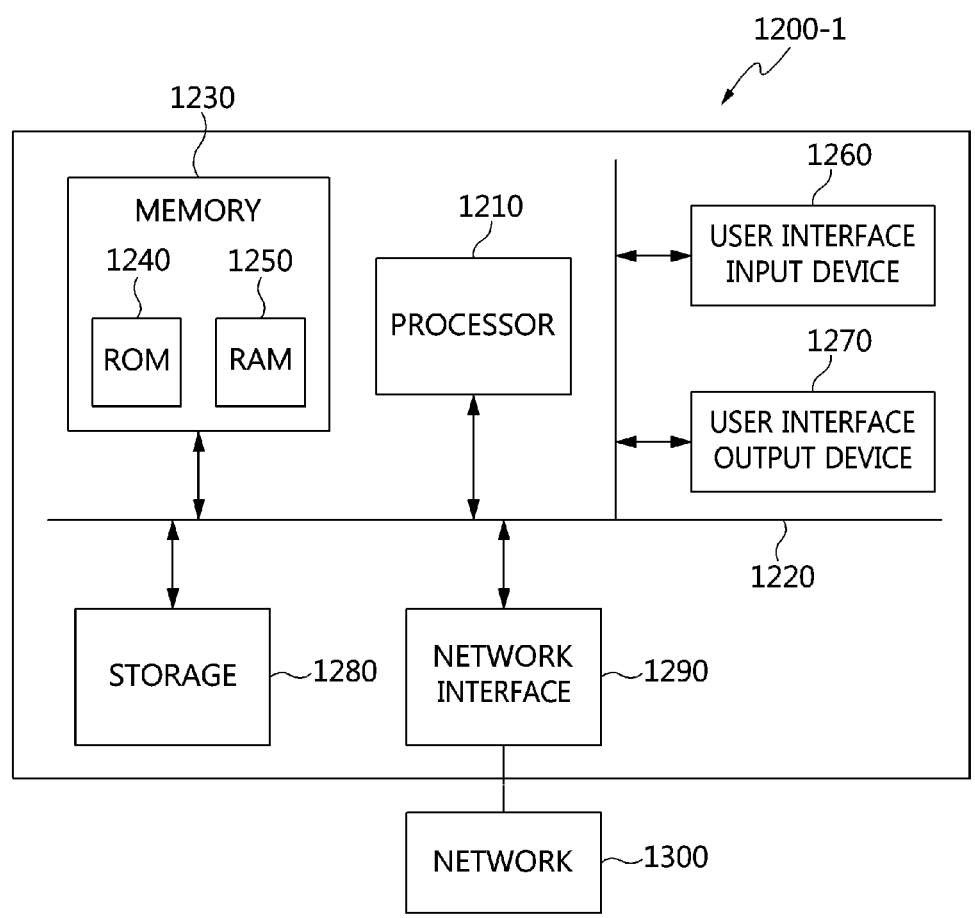
FIG. 10 is an embodiment of the present invention implemented in a computer system.

FIG. 10 is an embodiment of the present invention may be implemented in a computer system, e.g., as a computer readable medium. As shown in FIG. 10, a computer system 1200-1 may include one or more of a processor 1210, a memory 1230, a user interface input device 1260, a user interface output device 1270, and a storage 1280, each of which communicates through a bus 1220. The computer system 1200-1 may also include a network interface 1290 that is coupled to a network 1300. The processor 1210 may be a central processing unit (CPU) or a semiconductor device that executes processing instructions stored in the memory 1230 and/or the storage 1280. The memory 1230 and the storage 1280 may include various forms of volatile or non-volatile storage media. For example, the memory may include a read-only memory (ROM) 1240 and a random access memory (RAM) 1250.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

According to the present invention, a 3D model of a dynamic object that moves or stops in open-air space may be reconstructed using cameras that are capable of moving by being installed in multiple drones and of capturing images by being synchronized on a time axis.

Also, according to the present invention, a geometric relationship between moving cameras, which changes on a time axis, may be estimated, and accurate 3D information about a moving object may be provided through multi-view stereo 3D reconstruction at each point at which an image is captured.

Also, according to the present invention, using a geometric relationship between moving cameras, a 3D model within overlapping fields of view may be reconstructed without distinction between a static background and a dynamic object.

As described above, the apparatus and method for reconstructing a 3D model according to the present invention are not limitedly applied to the configurations and operations of the above-described embodiments, but all or some of the embodiments may be selectively combined and configured, so that the embodiments may be modified in various ways.

What is claimed is:

1. An apparatus for reconstructing a 3D model, comprising:
    an image acquisition unit configured to acquire, using a processor, multi-view images by receiving image signals captured by multiple drones using cameras;
    a geometric calibration unit configured to estimate, using a processor, motion variables of the drones based on the multi-view images; and
    a 3D model creation unit configured to reconstruct, using a processor, a 3D model of a dynamic object from the multi-view images using a multi-view stereo method,
    wherein the multiple drones are configured to be synchronized on a same time axis in consideration of a preset baseline and to capture the dynamic object using the cameras, and
    wherein the geometric calibration unit comprises:
        an individual geometric calibration unit configured to generate 3D point clouds of a static background for each of the drones based on the multi-view images and to estimate the motion variables based on one or more spatial axes;
        a background-matching unit configured to generate 3D information of the static background and 3D transform information by matching the 3D point clouds of the static background, and to estimate the motion variables based on one of the one or more spatial axes using the 3D information of the static background and the 3D transform information; and
        a bundle adjustment unit configured to optimize the 3D information of the static background using a bundle adjustment method.

2. The apparatus of claim 1, wherein, when a Euclidean distance between 3D points of the 3D point clouds is equal to or less than a preset value and an average color intensity in a block image based on projective coordinates, acquired by projecting the 3D points onto a frame image on which features corresponding to the 3D points are detected, is equal to or less than another preset value, the background-matching unit determines that the 3D points are a same 3D point.

3. The apparatus of claim 2, wherein the background-matching unit generates the 3D transform information from any one of the 3D point clouds of the static background using an Iterative Closest Point (ICP) algorithm.

4. The apparatus of claim 3, wherein the bundle adjustment unit optimizes the 3D information by transforming the motion variables such that trajectories of the multiple drones are arranged on the one spatial axis using the 3D transform information.

5. The apparatus of claim 4, wherein the bundle adjustment unit performs the bundle adjustment method using the transformed motion variables and the 3D information of the static background.

6. The apparatus of claim 5, wherein the 3D model creation unit is configured to estimate a geometric relationship between the drones using the transformed motion variables and to reconstruct the 3D model of the dynamic object based on the geometric relationship.

7. The apparatus of claim 6, wherein the 3D model creation unit generates a depth map for reconstructing the 3D model of the dynamic object based on a region that includes the moving dynamic object in the multi-view images using a multi-view stereo method in which the geometric relationship on a same time axis is used.

8. The apparatus of claim 7, wherein the 3D model creation unit generates any one of a 3D voxel model and a 3D mesh model of the dynamic object for each point on a time axis by blending the depth map.

9. An apparatus, comprising:
    a processor; and
    a memory storing non-transitory processing instructions, which, when executed by the processor, cause the processor to:
    acquire multi-view images by receiving image signals captured by multiple drones;
    estimate motion variables of the drones based on the multi-view images; and
    reconstruct a 3D model of a dynamic object from the multi-view images using a multi-view stereo method,
    wherein the processing instructions cause the processor to estimate the motion variables by:
        generating 3D point clouds of a static background for each of the drones based on the multi-view images and estimating the motion variables based on one or more spatial axes;
        generating 3D information of the static background and 3D transform information by matching the 3D point clouds of the static background and estimating the motion variables based on one of the one or more spatial axes using the 3D information of the static background and the 3D transform information; and
        optimizing the 3D information of the static background using a bundle adjustment method.

10. The apparatus of claim 9, wherein the processing instructions, when executed by the processor, cause the processor to estimate the motion variables based on one of the one or more spatial axes, and
    wherein when a Euclidean distance between 3D points of the 3D point clouds is equal to or less than a preset value and an average color intensity in a block image based on projective coordinates, acquired by projecting the 3D points onto a frame image on which features corresponding to the 3D points are detected, is equal to or less than another preset value, the processor determines that the 3D points are a same 3D point.

11. The apparatus of claim 10, wherein the processing instructions, when executed by the processor, cause the processor to estimate the motion variables by generating the 3D transform information from any one of the 3D point clouds of the static background using an Iterative Closest Point (ICP) algorithm.

12. The apparatus of claim 11, wherein the processing instructions, when executed by the processor, cause the processor to optimize the 3D information by transforming the motion variables such that trajectories of the multiple drones are arranged on the one spatial axis using the 3D transform information.

* * * * *